United States Patent
Kano et al.

(10) Patent No.: US 10,770,719 B2
(45) Date of Patent: *Sep. 8, 2020

(54) NEGATIVE ELECTRODE ACTIVE MATERIAL AND BATTERY

(71) Applicant: Panasonic Intellectual Property Management Co., Ltd., Osaka (JP)

(72) Inventors: Akira Kano, Osaka (JP); Junko Matsushita, Osaka (JP); Nobuhiko Hojo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 215 days.

This patent is subject to a terminal disclaimer.

(21) Appl. No.: 15/595,949

(22) Filed: May 16, 2017

(65) Prior Publication Data

US 2017/0346080 A1    Nov. 30, 2017

(30) Foreign Application Priority Data

May 27, 2016 (JP) .................. 2016-105987

(51) Int. Cl.
*H01M 4/36* (2006.01)
*H01M 4/38* (2006.01)
(Continued)

(52) U.S. Cl.
CPC .......... *H01M 4/364* (2013.01); *H01M 4/386* (2013.01); *H01M 4/483* (2013.01); *H01M 4/587* (2013.01);
(Continued)

(58) Field of Classification Search
None
See application file for complete search history.

(56) References Cited

U.S. PATENT DOCUMENTS 6,395,427 B1    5/2002  Sheem et al.
6,485,864 B1 *  11/2002 Miyazawa ............. C01B 32/20
                                                              423/448
(Continued)

FOREIGN PATENT DOCUMENTS

EP    1482582 A2    12/2004
EP    2784860 A1    10/2014
(Continued)

OTHER PUBLICATIONS

Arie "Effect of boron doped fullerene C60 film coating on the electrochemical characteristics of silicon thin film anodes for lithium secondary batteries", Synthetic Metals 161 (2011) 158-165 (Year: 2011).*

(Continued)

*Primary Examiner* — Devina Pillay
(74) *Attorney, Agent, or Firm* — McDermott Will & Emery LLP

(57) ABSTRACT

A negative electrode active material includes a carbon material including boron and a silicon material including at least one selected from silicon and silicon oxide. The silicon material does not include boron. A peak of a B1s spectrum of the carbon material occurs at a binding energy of 187.0 eV or more and 192.0 eV or less, the B1s spectrum being measured by X-ray photoelectron spectroscopy. The ratio of the area of the peak of the B1s spectrum of the carbon material which occurs at a binding energy of 187.0 eV or more and 192.0 eV or less, the B1s spectrum being measured by X-ray photoelectron spectroscopy, to the total area of peaks of the B1s spectrum which occur at a binding energy of 184.0 eV or more and 196.5 eV or less is 50% or more.

10 Claims, 2 Drawing Sheets

(51) Int. Cl.
   *H01M 4/48*      (2010.01)
   *H01M 4/587*     (2010.01)
   *H01M 10/0525*   (2010.01)
   *H01M 4/02*      (2006.01)

(52) U.S. Cl.
   CPC .. *H01M 10/0525* (2013.01); *H01M 2004/027* (2013.01)

(56) References Cited

U.S. PATENT DOCUMENTS

| | | | |
|---|---|---|---|
| 6,521,380 B1 | 2/2003 | Ryu et al. | |
| 2006/0166098 A1 | 7/2006 | Tabuchi et al. | |
| 2007/0111101 A1* | 5/2007 | Ohkubo | H01M 4/13 429/232 |
| 2010/0288970 A1* | 11/2010 | Watanabe | H01M 4/0428 252/182.1 |

FOREIGN PATENT DOCUMENTS

| | | | |
|---|---|---|---|
| JP | 2000-313609 | 11/2000 | |
| JP | 2001-076726 | 3/2001 | |
| JP | 2004-146292 A | 5/2004 | |
| JP | 2004146292 A * | 5/2004 | ............. H01M 4/38 |

OTHER PUBLICATIONS

Wang, "Fabrication of boron-doped carbon fibers by the decomposition of B4C and its excellent rate performance as an anode material for lithium-ion batteries" Solid State Sciences 41 (Feb. 2015) 36e42 (Year: 2015).*

Tabuchi, JP2004-146292, Machine Translation, 2004 (Year: 2004).*

The Extended European Search Report dated Aug. 10, 2017 for the related European Patent Application No. 17170757.3.

Arie A A et al: "Effect of boron doped fullerene C60 film coating on the electrochemical characteristics of silicon thin film anodes for lithium secondary batteries", Synthetic Metals, Elsevier Sequoia, Lausanne, CH, vol. 161, No. 1-2, Jan. 1, 2011 (Jan. 1, 2011), pp. 158-165, XP027578941.

Communication pursuant to Article 94(3) EPC dated Feb. 25, 2019 for the related European Patent Application No. 17170757.3.

J Yang et al: "SiO x-based anodes for secondary lithium batteries", Solid State Ionics, 152-153 (2002), Dec. 31, 2002 (Dec. 31, 2002), pp. 125-129, XP055558966.

The Extended European Search Report dated Dec. 15, 2016 for the related European Patent Application No. 16193029.2.

Notice of Allowance issued in related U.S. Appl. No. 15/285,065, dated Dec. 12, 2017.

* cited by examiner

NEGATIVE ELECTRODE ACTIVE MATERIAL AND BATTERY

BACKGROUND

1. Technical Field

The present disclosure relates to a negative electrode active material and a battery.

2. Description of the Related Art

Japanese Unexamined Patent Application Publication No. 2001-76726 discloses a negative electrode active material for lithium secondary batteries which includes a mixed powder of a carbon material powder that includes or does not include boron and a silicon material powder that includes boron. The content of boron in the silicon material powder is 0.1% to 50% by weight.

SUMMARY

Production of a negative electrode active material and a battery that are capable of achieving improved cycle characteristics without reducing the high discharge capacity density of silicon or silicon oxide has been desired.

In one general aspect, the techniques disclosed here feature a negative electrode active material including a carbon material including boron and a silicon material including at least one selected from silicon and silicon oxide. The silicon material does not include boron. A peak of a B1s spectrum of the carbon material which is measured by X-ray photoelectron spectroscopy occurs at a binding energy of 187.0 eV or more and 192.0 eV or less. The ratio of the area of the peak of the B1s spectrum of the carbon material which is measured by X-ray photoelectron spectroscopy, the peak occurring at a binding energy of 187.0 eV or more and 192.0 eV or less, to the total area of peaks of the B1s spectrum which occur at a binding energy of 184.0 eV or more and 196.5 eV or less is 50% or more.

One non-limiting and exemplary embodiment provides a negative electrode active material and a battery that are capable of achieving improved cycle characteristics without reducing the high discharge capacity density of silicon or silicon oxide.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
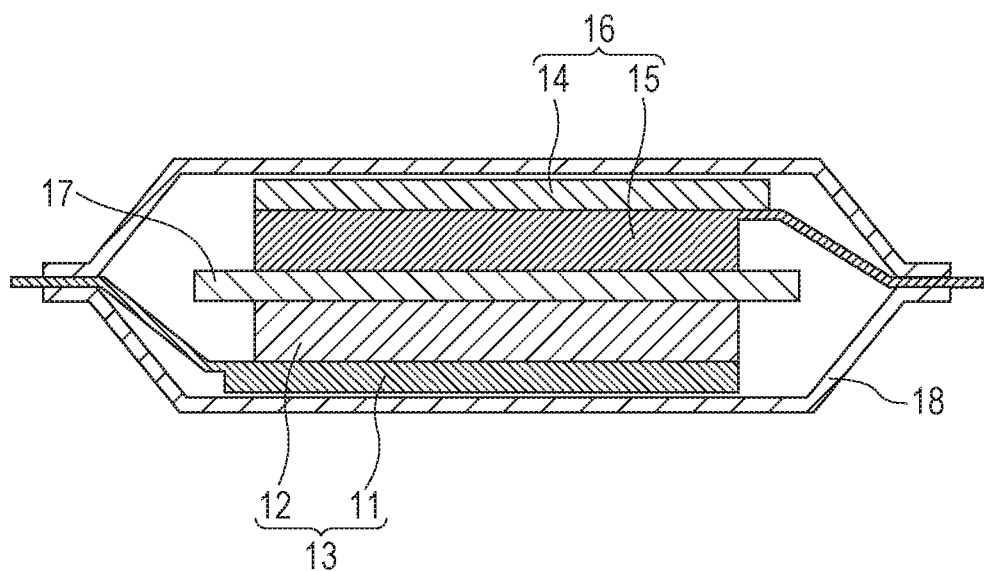
FIG. 1 is a schematic cross-sectional view of a battery that is an example of a battery according to Embodiment 2.

Embodiments of the present disclosure are described below.

The inventor of the present invention focused on the following points.

Silicon and silicon oxide are negative electrode active materials having a high discharge capacity density. However, when charging and discharging are performed, these active materials significantly expand or shrink and the volumes of the active materials vary by up to 410%. This may result in the breakage of the electron-conduction network formed in the electrode, that is, for example, the occurrence of cracking of active material particles or detachment between the active material particles or between the particles and the substrate. This increases internal resistance and, as a result, degrades the cycle characteristics.

Accordingly, studies have been performed on using silicon or silicon oxide in combination with a carbon material such as graphite and on improving silicon or silicon oxide to limit the increase in resistance which may occur due to the change in volume and breakage of the electron-conduction network. However, the above approaches may be insufficient from the viewpoint of achieving a high discharge capacity density and improved cycle characteristics.

For example, a silicon material powder including boron is described in Japanese Unexamined Patent Application Publication No. 2001-76726. When a silicon material includes boron, the number of sites included in the silicon material which are capable of occluding and releasing ions during charging and discharging may be reduced. This substantially reduces the charge-discharge capacity (i.e., the depth of charging).

The inventor of the present invention conceived the structure of the present disclosure from the above viewpoints.

Embodiment 1

A negative electrode active material according to Embodiment 1 includes a carbon material and a silicon material.

The carbon material includes boron.

A peak of a B1s spectrum of the carbon material which is measured by X-ray photoelectron spectroscopy (XPS) occurs at a binding energy of 187.0 eV or more and 192.0 eV or less.

The silicon material includes at least one selected from silicon and silicon oxide.

The silicon material does not include boron.

A negative electrode active material, a negative electrode for batteries, and a battery that have the above-described structure may achieve improved cycle characteristics without reducing the high discharge capacity density of silicon or silicon oxide.

One of the features of the negative electrode active material according to Embodiment 1 is the carbon material (e.g., a graphite material) used in combination with silicon or silicon oxide. The inventor of the present invention analyzed various chemical states of boron included in the carbon material, studied the reactivity of the carbon material with lithium ions, and, as a result, found that increasing the amount of boron included in a carbon material in a specific state may enable the negative electrode active material to achieve improved cycle characteristics without reducing the discharge capacity density of silicon or silicon oxide.

The negative electrode active material according to Embodiment 1 is considered to achieve improved characteristics due to the following reasons.

The number of electrons included in a boron atom is smaller than the number of electrons included in a carbon atom by one. Thus, controlling the amount of boron included in a carbon material to be appropriate is considered to reduce the density of electrons in the carbon material. A reduction in the density of electrons increases the likelihood of the carbon material receiving electrons from positively charged cations such as lithium ions. Consequently, the cations are likely to accumulate at the surface of the carbon material and positively charge the surface of the carbon material. On the other hand, it can be confirmed by measuring the zeta potential or the like that the surface of silicon or silicon oxide is negatively charged.

Accordingly, using the negative electrode active material according to Embodiment 1 increases the interaction between the positively charged carbon material including boron in an adequate manner and negatively charged silicon or silicon oxide and enables a further strong electron-conduction network to be formed. Furthermore, the likelihood of cations accumulating at the interface between the carbon material including boron in an adequate manner and silicon or silicon oxide is increased. This enables a suitable ion-conduction network to be formed.

Examples of a state of boron included in the carbon material include the state in which a boron atom is bonded to a carbon atom, the state in which a boron atom is bonded to another boron atom, and the state in which a boron atom is bonded to a trace element such as an oxygen atom or a nitrogen atom. Examples of the boron atom bonded to a carbon atom include a boron atom dissolved inside a carbon layer, a boron atom dissolved between carbon layers, and a boron atom included in a carbide such as $B_4C$.

The peak that occurs at a binding energy of 187.0 eV or more and 192.0 eV or less in the B1s spectrum of the carbon material which is measured by XPS is considered to result from a bond (C—B) between a carbon atom and a boron atom dissolved inside a carbon layer and a bond (C—B—N) between a carbon atom and boron and nitrogen atoms dissolved inside a carbon layer.

Thus, when a peak occurs in this range, some of the boron atoms included in the carbon material are bonded to a carbon atom and dissolved inside a carbon layer. This enables the density of electrons in the carbon material to be reduced sufficiently. As a result, a suitable interface may be formed when the carbon material is used in combination with silicon or silicon oxide. This makes it possible to achieve improved cycle characteristics without reducing the high discharge capacity density of silicon or silicon oxide.

In the negative electrode active material according to Embodiment 1, in which the silicon material does not include boron, a reduction in the number of sites included in the silicon material which are capable of occluding and releasing ions during charging and discharging may be limited. This may limit a reduction in the charge-discharge capacity.

XPS is a type of photoelectron spectroscopy techniques. In XPS, the surface of a sample is irradiated with an X-ray, and the energy (i.e., binding energy) of photoelectrons which is measured with reference to that of the X-ray and the number of the photoelectrons are measured. It is possible to analyze elements constituting the sample and the chemical states of elements on the basis of the energy and number of the photoelectrons.

In the case where the carbon material (e.g., a graphite material) is covered with another element or a compound, the above measurement may be conducted while the surface of the sample is ion-etched with an Ar-ion gun or the like.

In the negative electrode active material according to Embodiment 1, the content of boron in the entire carbon material may be 0.5% or more in terms of the atomic mass of boron.

In such a case, a further suitable interface may be formed between the carbon material and the silicon material.

In contrast, if the content of boron in the entire carbon material is less than 0.5%, the suitable interface may fail to be formed when the carbon material is used in combination with silicon or silicon oxide.

In the negative electrode active material according to Embodiment 1, the carbon material may be a graphite material.

In such a case, a negative electrode active material and a battery that are capable of achieving improved input characteristics while maintaining the high discharge capacity density of the graphite material may be produced.

The boron content may be determined by inductively coupled plasma (ICP)-atomic emission spectroscopy.

In the negative electrode active material according to Embodiment 1, the carbon material may include nitrogen.

In such a case, the discharge capacity may be further increased.

In the negative electrode active material according to Embodiment 1, the content of nitrogen in the entire carbon material may be 0.4% or more in terms of the atomic mass of nitrogen.

In such a case, a further suitable interface may be sufficiently formed when the carbon material including boron and nitrogen is used in combination with silicon or silicon oxide.

The nitrogen content may be determined by an inert gas fusion-thermal conductivity method.

In the negative electrode active material according to Embodiment 1, the ratio of the area of the peak of the B1s spectrum of the carbon material which is measured by XPS, the peak occurring at a binding energy of 187.0 eV or more and 192.0 eV or less, to the total area of peaks of the B1s spectrum which occur at a binding energy of 184.0 eV or more and 196.5 eV or less may be 50% or more.

The peak that occurs at a binding energy of 187.0 eV or more and 192.0 eV or less is considered to result from a bond (C—B) between a carbon atom and a boron atom dissolved inside a carbon layer and a bond (C—B—N) between a carbon atom and boron and nitrogen atoms dissolved inside a carbon layer.

Thus, when the proportion of the area of the peak is 50% or more, the ratio of the number of boron atoms that are bonded to a carbon atom and dissolved inside a carbon layer to the number of boron atoms included in the carbon material is sufficiently large. As a result, the density of electrons in the carbon material can be reduced to a sufficient degree. This enables a negative electrode active material that has a further high discharge capacity density and is capable of achieving further improved cycle characteristics to be produced.

It is possible to determine, by XPS, the chemical state of an element by calculating the proportion of the area of a peak that occurs at a specific binding energy which corresponds to the element.

The proportion of the area of a peak can be calculated in the following manner. The integrated intensities of peaks that occur in a B1s spectrum at a binding energy of 184.0 eV or more and 196.5 eV or less are calculated. A peak corresponding to each chemical state is defined using a Gaussian function or a Lorentz function, and peak fitting is done. The integrated intensity of each peak is calculated on the basis of the results of the peak fitting. Thus, the proportion of the area of each peak can be calculated. When the peaks are asymmetrical, the asymmetry of the peaks may be taken into account.

In the case where the carbon material is covered with another element or a compound, the above measurement may be conducted while the surface of the sample is ion-etched with an Ar-ion gun or the like.

In the negative electrode active material according to Embodiment 1, a peak of the B1s spectrum of the carbon material which is measured by XPS may occur at a binding energy of 187.0 eV or more and 188.5 eV or less.

The peak that occurs in the above range is considered to result from some of boron atoms included in the carbon material which are dissolved inside a carbon layer and each forming a bond (C—B) together with a carbon. Thus, when a peak occurs in the above range, the density of electrons in the carbon material, which is used in combination with silicon or silicon oxide, may be further reduced. This enables a negative electrode active material that has a further high discharge capacity density and is capable of achieving further improved cycle characteristics to be produced.

In the negative electrode active material according to Embodiment 1, the ratio of the area of the peak of the B1s spectrum of the carbon material which is measured by XPS, the peak occurring at a binding energy of 187.0 eV or more and 188.5 eV or less, to the total area of peaks of the B1s spectrum which occur at a binding energy of 184.0 eV or more and 196.5 eV or less may be 50% or more.

The peak that occurs at a binding energy of 187.0 eV or more and 188.5 eV or less is considered to result from a bond (C—B) between a carbon atom and a boron atom dissolved inside a carbon layer.

Thus, when the proportion of the area of the peak is 50% or more, the ratio of the number of boron atoms that are each bonded to a carbon atom and dissolved inside a carbon layer to the number of boron atoms included in the carbon material is further increased. As a result, the density of electrons in the carbon material can be further reduced. This enables a negative electrode active material capable of achieving further improved cycle characteristics to be produced.

In the negative electrode active material according to Embodiment 1, the ratio of the amount of silicon or silicon oxide included in the silicon material to the total amount of the negative electrode active material may be 0.5% by weight or more and 50% by weight or less.

In such a case, it is possible to sufficiently utilize the high discharge capacity density of silicon or silicon oxide while limiting the expansion and shrinkage of the negative electrode active material which occurs during charging and discharging.

However, if the above ratio is less than 0.5% by weight, the high discharge capacity density of silicon or silicon oxide may become degraded. If the above ratio is more than 50% by weight, the amount of expansion or shrinkage of the negative electrode active material which occurs during charging and discharging may be increased and, as a result, the cycle characteristics may become degraded.

Silicon oxide included in the negative electrode active material according to Embodiment 1 may be $SiO_x$, where $0.1 \leq x \leq 1.2$.

In such a case, a reduction in the discharge capacity density may be limited.

However, if x exceeds 1.2, a large irreversible capacity is created in the first charge-discharge step and, as a result, the initial charge-discharge efficiency is reduced. This may reduce the discharge capacity density.

The oxygen content in silicon oxide may be determined by an inert gas fusion-infrared absorption method.

In the negative electrode active material according to Embodiment 1, the surface of the silicon material (e.g., silicon or silicon oxide) may be coated with carbon.

In such a case, a further suitable electron-conduction network may be formed and, as a result, a negative electrode active material capable of achieving further improved cycle characteristics may be produced.

For coating the silicon material (e.g., silicon or silicon oxide) with carbon, for example, chemical vapor deposition (CVD) may be employed.

The negative electrode active material according to Embodiment 1 may further include lithium silicate, which may be a material represented by, for example, $Li_{2z}SiO_{(2+z)}$, where $0<z<2$.

Method for Producing Carbon Material

A method for producing a graphite material is described below as an example of a method for producing the carbon material including boron or boron and nitrogen which is included in the negative electrode active material according to Embodiment 1. The graphite material can be produced by, for example, mixing a boron source with an organic material or an amorphous carbon material that serves as a carbon source, and firing the resulting mixture in an inert atmosphere.

The organic material that serves as a carbon source may be a synthetic resin such as polyvinyl alcohol. The synthetic resin may be in a sheet form, fibrous, particulate, or the like. The synthetic resin is preferably a particulate or short-fibrous synthetic resin having a size of a few micrometers to several tens of micrometers in consideration of ease of post-firing processing. The heat treatment is preferably performed at 2,100° C. to 3,000° C. The atmosphere in which the firing treatment is performed is suitably an inert gas such as nitrogen, argon, helium, neon, or the like. A nitrogen atmosphere is more preferable in terms of the costs. While the organic material is heated to about 1,000° C., elements other than carbon evaporate from the raw material used as a carbon source. Thus, carbonization of the raw material proceeds. Subsequently, while the organic material is heated to 2,100° C. to 3,000° C., graphitization of carbon proceeds. Meanwhile, the carbon source and the boron source react with each other and, as a result, dissolution of boron in the carbon layers proceeds.

Performing firing in a nitrogen atmosphere enables both boron and nitrogen to dissolve inside carbon layers.

The amorphous carbon material may be soft carbon such as petroleum coke or coal coke. The soft carbon may be in a sheet form, fibrous, particulate, or the like. The soft carbon is preferably a particulate or short-fibrous soft carbon having a size of a few micrometers to several tens of micrometers in consideration of ease of post-firing processing. The heat treatment is preferably performed at 2,100° C. to 3,000° C. The atmosphere in which the firing treatment is performed is suitably an inert gas such as nitrogen, argon, helium, neon, or the like. This heat treatment causes graphitization of carbon to proceed. Meanwhile, the carbon source and the boron source react with each other and, as a result, dissolution of boron in the carbon layers proceeds.

Graphite has a structure in which hexagonal network plane layers constituted by carbon atoms are stacked on top of one another in a regular pattern. Specifically, the term "graphite" refers to highly crystalline carbon constituted by carbon layers that are arranged at plane intervals of 3.4 Å or less and have a crystallite thickness of 100 Å or more. It is also important to increase the degree of graphitization of the carbon material in order to increase the capacity of the carbon material for negative electrodes. The plane intervals at which the carbon layers are arranged and the crystallite thickness of the carbon layers can be determined by, for example, an X-ray diffraction (XRD) analysis of the carbon material.

The boron source may be a diboride such as aluminum diboride or magnesium diboride. Since the above diborides have a crystal structure analogous to that of graphite and are capable of being decomposed at low temperatures, using the above diborides as a boron source enables both dissolution of boron in the carbon layers and graphitization of the carbon material to proceed in an effective manner.

The ratio between the amount of carbon source and the amount of boron source may be such that the amount of boron source is 0.5% to 30% of the amount of carbon source in terms of the atomic mass of boron. If the amount of boron source is less than 0.5% of the amount of carbon source in terms of the atomic mass of boron, the number of boron atoms, which reduce the density of electrons in the carbon layers, may become excessively small. If the amount of boron source is more than 30% of the amount of carbon source in terms of the atomic mass of boron, the proportion of boron carbide, such as $B_4C$, may become large.

The proportion of the area of a peak that occurs at a binding energy of 187.0 eV or more and 192.0 eV or less and the proportion of the area of a peak that occurs at a binding energy of 187.0 eV or more and 188.5 eV or less can be controlled by, for example, changing the type of the carbon source used, the type of the boron source used, the ratio between the amount of carbon source and the amount of boron source, or the heat-treatment conditions in the preparation of the graphite material.

As described above, a method for producing a graphite material including boron or boron and nitrogen according to an example of Embodiment 1 includes producing an organic material or an amorphous carbon material that serves as a carbon source; mixing the organic material or the amorphous carbon material with a boron source; and heating the resulting mixture in an inert atmosphere.

Embodiment 2

Embodiment 2 is described below. Parts of the description of Embodiment 2 which are the same as those in Embodiment 1 above are omitted, as appropriate.

A battery according to Embodiment 2 includes a negative electrode, a positive electrode, and an electrolyte.

The negative electrode includes the negative electrode active material according to Embodiment 1.

The above-described battery may achieve improved cycle characteristics without reducing the high discharge capacity density of silicon or silicon oxide battery.

In the battery according to Embodiment 2, the negative electrode active material according to Embodiment 1 may be included in the negative electrode as a main component.

In other words, the amount of the negative electrode active material according to Embodiment 1 included in the negative electrode may be 50% by weight or more of the total amount of negative electrode materials such as a negative electrode mixture layer.

In such a case, a battery that has a further high discharge capacity density and is capable of achieving further improved cycle characteristics may be produced.

In another case, the amount of the negative electrode active material according to Embodiment 1 included in the negative electrode may be 90% by weight or more of the total amount of negative electrode materials such as a negative electrode mixture layer.

In such a case, a battery that has a further high discharge capacity density and is capable of achieving further improved cycle characteristics may be produced.

Alternatively, a negative electrode active material layer included in the battery according to Embodiment 2 may further include, in addition to the negative electrode active material which serves as a main component, inevitable impurities; starting materials used in the synthesis of the negative electrode active material; and by-products, decomposition products, and the like that are produced in the synthesis of the negative electrode active material.

In the battery according to Embodiment 2, the amount of the negative electrode active material according to Embodiment 1 included in the negative electrode active material layer may be, for example, 100% by weight of the amount of entire negative electrode active material layer which excludes the amount of the inevitable impurities.

In such a case, a battery that has a further high discharge capacity density and is capable of achieving further improved cycle characteristics may be produced.

FIG. 1 is a schematic cross-sectional view of a battery 10, which is an example of the battery according to Embodiment 2.

The battery 10 includes a negative electrode 13, a positive electrode 16, a separator 17, and a package 18 as illustrated in FIG. 1.

The negative electrode 13 includes a negative electrode current collector 11 and a negative electrode mixture layer (i.e., a negative electrode active material layer) 12 disposed on the negative electrode current collector 11.

The positive electrode 16 includes a positive electrode current collector 14 and a positive electrode mixture layer (i.e., a positive electrode active material layer) 15 disposed on the positive electrode current collector 14.

The negative electrode 13 and the positive electrode 16 face each other across the separator 17.

The battery 10 further includes a package 18 that covers the above components.

The negative electrode mixture layer 12 includes the negative electrode active material according to Embodiment 1.

The negative electrode mixture layer 12 may optionally include a negative electrode active material other than the negative electrode active material according to Embodiment 1 which is capable of occluding and releasing lithium ions; a conductive aid; an ion conductor; a binder; and the like.

The conductive aid and the ion conductor are used for reducing electrode resistance. Examples of the conductive aid include carbon materials (i.e., carbon conductive aids), such as carbon black, graphite, and acetylene black; and conducting polymers, such as polyaniline, polypyrrole, and polythiophene. Examples of the ion conductor include gel electrolytes such as polymethyl methacrylate; organic solid electrolytes such as polyethylene oxide; and inorganic solid electrolytes such as $Li_7La_3Zr_2O_{12}$.

The binder is used for improving the binding property of a material of electrodes. Specific examples of the binder include polyvinylidene fluoride, a vinylidene fluoride-hexafluoropropylene copolymer, a vinylidene fluoride-tetrafluoroethylene copolymer, polytetrafluoroethylene, carboxymethylcellulose, polyacrylic acid, a styrene-butadiene rubber, polypropylene, polyethylene, and polyimide.

The negative electrode current collector 11 may be a porous or non-porous sheet or film made of a metal such as stainless steel, nickel, copper, or an alloy of these metals. Examples of the sheet or film include a metal foil and a mesh. A carbon material, such as carbon, that serves as a conductive auxiliary material may be applied onto the surface of the negative electrode current collector 11 in order to reduce resistance, to impart a catalytic effect, and to increase the degree of bonding between the negative electrode mixture layer 12 and the negative electrode current collector 11 by causing the negative electrode mixture layer 12 and the negative electrode current collector 11 to be chemically or physically bonded to each other.

The positive electrode mixture layer 15 includes a positive electrode active material capable of occluding and releasing lithium ions.

The positive electrode mixture layer 15 may optionally include a conductive aid, an ion conductor, a binder, and the like that are the same as those that may be optionally included in the negative electrode mixture layer 12.

The positive electrode active material is a material capable of occluding and releasing lithium ions. Examples of the positive electrode active material include a metal-lithium-containing transition-metal oxide, a transition-metal fluoride, a polyanionic material, a fluorinated polyanionic material, and a transition-metal sulfide. Among the above positive electrode active materials, in particular, a metal-lithium-containing transition-metal oxide is preferably used because it reduces the production costs and increases the average discharge voltage.

The positive electrode current collector 14 may be a porous or non-porous sheet or film made of a metal such as aluminum, stainless steel, titanium, or an alloy of these metals. Among the above materials, aluminum and an alloy of aluminum are preferable because they are not expensive and capable of being readily formed into a thin sheet or film. Examples of the sheet and film include a metal foil and a mesh. A carbon material, such as carbon, may be applied onto the surface of the positive electrode current collector 14 in order to reduce resistance, to impart a catalytic effect, and to increase the degree of bonding between the positive electrode mixture layer 15 and the positive electrode current collector 14 by causing the positive electrode mixture layer 15 and the positive electrode current collector 14 to be chemically or physically bonded to each other.

The electrolyte used in Embodiment 2 may be a nonaqueous electrolyte. Examples of the electrolyte used in this embodiment include electrolyte solutions, gel electrolytes, and solid electrolytes that include a lithium salt and a nonaqueous solvent.

Examples of the lithium salt include lithium hexafluorophosphate ($LiPF_6$), lithium tetrafluoroborate ($LiBF_4$), lithium perchlorate ($LiClO_4$), lithium bistrifluoromethylsulfonylimide ($LiN(SO_2CF_3)_2$), lithium bisperfluoroethylsulfonylimide ($LiN(SO_2C_2F_5)_2$), lithium bisfluoromethylsulfonylimide ($LiN(SO_2F)_2$), $LiAsF_6$, $LiCF_3SO_3$, and lithium difluoro(oxalato)borate. Among the above lithium salts, in particular, $LiPF_6$ is preferably used in terms of the safety and thermal stability of the battery and ionic conductivity. The above electrolyte salts may be used alone or in combination of two or more.

Examples of the nonaqueous solvent include nonaqueous solvents used in common batteries, such as cyclic carbonates, chain carbonates, esters, cyclic ethers, chain ethers, nitriles, and amides. The above nonaqueous solvents may be used alone or in combination of two or more.

Examples of the cyclic carbonates include ethylene carbonate, propylene carbonate, and butylene carbonate. Some or all of the hydrogen groups included in the above cyclic carbonates may be fluorinated. Examples of such cyclic carbonates include trifluoropropylene carbonate and fluoroethyl carbonate.

Examples of the chain carbonates include dimethyl carbonate, ethyl methyl carbonate, diethyl carbonate, methyl propyl carbonate, ethyl propyl carbonate, and methyl isopropyl carbonate. Some or all of the hydrogen groups included in the above chain carbonates may be fluorinated.

Examples of the esters include methyl acetate, ethyl acetate, propyl acetate, methyl propionate, ethyl propionate, and γ-butyrolactone.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ether.

Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile.

Examples of the amides include dimethylformamide.

The battery according to Embodiment 2 may have any shape such as a coin-like shape, a cylindrical shape, a rectangular shape, a sheet-like shape, a button-like shape, a flat shape, or a multilayer shape.

EXAMPLES

Examples described below are merely examples and do not limit the present disclosure.

Example 1

Preparation of Carbon Material

An aluminum diboride powder was mixed with a petroleum coke powder having an average particle diameter of 12 µm by pulverizing in an agate mortar such that the amount of aluminum diboride powder was 10.0% of the amount of petroleum coke powder in terms of the atomic mass of boron. The resulting mixture was heated at room temperature to 2,800° C. at a rate of 10° C./min in a firing furnace containing an Ar atmosphere (Ar gas flow rate: 1 L/min) and maintained at 2,800° C. for 1 hour. Subsequently, heating was stopped. After natural cooling had been performed, the resulting carbon material was removed from the firing furnace. The carbon material prepared by the above firing treatment was then pulverized in an agate mortar and sieved with an SUS standard sieve having an aperture of 40 µm. Hereby, a carbon powder was prepared.

A carbon material of Example 1 was prepared in the above-described manner.

Preparation of Negative Electrode Active Material

The carbon material of Example 1 and a silicon powder (purity: 99.9%, particle diameter: 3 µm) were weighed out such that the proportion of silicon was 0.5% by weight and sufficiently mixed with each other in an agate mortar. Hereby, a negative electrode active material was prepared.

Preparation of Negative Electrode

The above negative electrode active material and polyimide used as a binder were weighed out such that the weight ratio of the negative electrode active material to the binder was 9:1.

The above materials were dispersed in a NMP solvent to form a slurry.

The slurry was applied to a Cu current collector with a coating machine. The resulting coating film was dried. Hereby, a negative electrode (i.e., a negative electrode plate) of Example 1 was formed.

Preparation of Test Electrode

The negative electrode plate was rolled with a rolling mill and subsequently cut into a square piece with 20-mm sides by punching.

This square piece was worked into an electrode. Hereby, a test electrode of Example 1 was prepared.

Preparation of Evaluation Cell

A lithium secondary battery (i.e., an evaluation cell) including counter and reference electrodes composed of metal lithium was prepared using the test electrode of Example 1.

An electrolyte solution and the evaluation cell were prepared in a glove box containing an Ar atmosphere having a dew point of −60° C. or less and an oxygen concentration of 1 ppm or less.

The electrolyte solution used was prepared by dissolving 1-mol % lithium hexafluorophosphate ($LiPF_6$) in a mixed solvent including ethylene carbonate and ethyl methyl carbonate at a volume ratio of 1:3.

The counter electrode used was prepared by press-bonding metal lithium to a square nickel mesh with 20-mm sides.

The test and counter electrodes were arranged to face each other across a polyethylene microporous separator impregnated with the electrolyte solution and subsequently placed inside a package. Then, the package was sealed.

The evaluation cell of Example 1 was prepared in the above-described manner.

Example 2

A carbon material was prepared as in Example 1 above.

The carbon material and a silicon powder (purity: 99.9%, particle diameter: 3 μm) were weighed out such that the proportion of silicon was 5% by weight and sufficiently mixed with each other in an agate mortar. Hereby, a negative electrode active material was prepared.

A negative electrode was prepared as in Example 1 using the negative electrode active material prepared in Example 2.

A test electrode and an evaluation cell were prepared as in Example 1.

Example 3

A carbon material was prepared as in Example 1 above.

The carbon material and a silicon powder (purity: 99.9%, particle diameter: 3 μm) were weighed out such that the proportion of silicon was 30% by weight and sufficiently mixed with each other in an agate mortar. Hereby, a negative electrode active material was prepared.

A negative electrode was prepared as in Example 1 using the negative electrode active material prepared in Example 3.

A test electrode and an evaluation cell were prepared as in Example 1.

Example 4

An aluminum diboride powder was mixed with a petroleum coke powder having an average particle diameter of 12 μm by pulverizing in an agate mortar such that the amount of aluminum diboride powder was 10.0% of the amount of petroleum coke powder in terms of the atomic mass of boron. The resulting mixture was heated at room temperature to 2,800° C. at a rate of 10° C./min in a firing furnace containing a $N_2$ atmosphere ($N_2$ gas flow rate: 1 L/min) and maintained at 2,800° C. for 1 hour.

The fired carbon material was subjected to the same treatment as in Example 1 above to form a carbon material of Example 4.

The carbon material and a powder of silicon oxide $SiO_{0.1}$ (particle diameter: 10 μm) were weighed out such that the proportion of silicon oxide was 0.5% by weight and sufficiently mixed with each other in an agate mortar. Hereby, a negative electrode active material was prepared.

A negative electrode was prepared as in Example 1 using the negative electrode active material prepared in Example 4.

A test electrode and an evaluation cell were prepared as in Example 1.

Example 5

A carbon material was prepared as in Example 4 above.

The carbon material and a powder of silicon oxide $SiO_{0.1}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Example 5.

A test electrode and an evaluation cell were prepared as in Example 1.

Example 6

A carbon material was prepared as in Example 1 above.

The carbon material and a powder of silicon oxide $SiO_{0.8}$ (particle diameter: 10 μm) were weighed out such that the proportion of silicon oxide was 5% by weight and sufficiently mixed with each other in an agate mortar. Hereby, a negative electrode active material was prepared.

A negative electrode was prepared as in Example 1 using the negative electrode active material prepared in Example 6.

A test electrode and an evaluation cell were prepared as in Example 1.

Example 7

A carbon material was prepared as in Example 1 above.

The carbon material and a powder of silicon oxide $SiO_{0.8}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Example 7.

A test electrode and an evaluation cell were prepared as in Example 1.

Example 8

A carbon material was prepared as in Example 4 above.

The carbon material and a powder of silicon oxide $SiO_{0.8}$ (particle diameter: 10 μm) were weighed out such that the proportion of silicon oxide was 5% by weight and sufficiently mixed with each other in an agate mortar. Hereby, a negative electrode active material was prepared.

A negative electrode was prepared as in Example 1 using the negative electrode active material prepared in Example 8.

A test electrode and an evaluation cell were prepared as in Example 1.

Example 9

A carbon material was prepared as in Example 4 above.

The carbon material and a powder of silicon oxide $SiO_{0.8}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Example 9.

A test electrode and an evaluation cell were prepared as in Example 1.

Example 10

A carbon material was prepared as in Example 4 above.

The carbon material and a powder of silicon oxide $SiO_{0.8}$ (particle diameter: 10 μm) were weighed out such that the proportion of silicon oxide was 50% by weight and sufficiently mixed with each other in an agate mortar. Hereby, a negative electrode active material was prepared.

A negative electrode was prepared as in Example 1 using the negative electrode active material prepared in Example 10.

A test electrode and an evaluation cell were prepared as in Example 1.

Example 11

A carbon material was prepared as in Example 4 above.

The surfaces of particles of a powder of silicon oxide $SiO_{1.2}$ (particle diameter: 10 μm) were coated with carbon such that the amount of carbon deposited was 10% by weight of the amount of silicon oxide $SiO_{1.2}$. For coating the surfaces of the $SiO_{1.2}$ particles with carbon, a CVD process was performed in a tubular furnace containing an Ar atmosphere.

The carbon material and a powder of silicon oxide $SiO_{1.2}$ coated with carbon (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Example 11.

A test electrode and an evaluation cell were prepared as in Example 1.

Comparative Example 1

In Comparative Example 1, a boron source was not added to the petroleum coke powder, while it was added to the petroleum coke powder in Example 1. That is, a petroleum coke powder having an average particle diameter of 12 μm was heated at room temperature to 2,800° C. at a rate of 10° C./min in a tubular furnace containing an Ar atmosphere (Ar gas flow rate: 1 L/min) and maintained at 2,800° C. for 1 hour.

The fired carbon material was subjected to the same treatment as in Example 1 above to form a carbon material of Comparative Example 1.

The carbon material and a silicon powder (purity: 99.9%, particle diameter: 3 μm) were weighed out such that the proportion of silicon was 0.5% by weight and sufficiently mixed with each other in an agate mortar. Hereby, a negative electrode active material was prepared.

A negative electrode was prepared as in Example 1 using the negative electrode active material prepared in Comparative Example 1.

A test electrode and an evaluation cell were prepared as in Example 1.

Comparative Example 2

A carbon material was prepared as in Comparative Example 1 above.

The carbon material and a silicon powder (purity: 99.9%, particle diameter: 3 μm) were weighed out such that the proportion of silicon was 5% by weight and sufficiently mixed with each other in an agate mortar. Hereby, a negative electrode active material was prepared.

A negative electrode was prepared as in Example 1 using the negative electrode active material prepared in Comparative Example 2.

A test electrode and an evaluation cell were prepared as in Example 1.

Comparative Example 3

A carbon material was prepared as in Comparative Example 1 above.

The carbon material and a silicon powder (purity: 99.9%, particle diameter: 3 μm) were weighed out such that the proportion of silicon was 30% by weight and sufficiently mixed with each other in an agate mortar. Hereby, a negative electrode active material was prepared.

A negative electrode was prepared as in Example 1 using the negative electrode active material prepared in Comparative Example 3.

A test electrode and an evaluation cell were prepared as in Example 1.

Comparative Example 4

A carbon material was prepared as in Comparative Example 1 above.

The carbon material and a powder of silicon oxide $SiO_{0.1}$ (particle diameter: 10 μm) were weighed out such that the proportion of silicon oxide was 0.5% by weight and sufficiently mixed with each other in an agate mortar. Hereby, a negative electrode active material was prepared.

A negative electrode was prepared as in Example 1 using the negative electrode active material prepared in Comparative Example 4.

A test electrode and an evaluation cell were prepared as in Example 1.

Comparative Example 5

A carbon material was prepared as in Comparative Example 1 above.

The carbon material and a powder of silicon oxide $SiO_{0.1}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Comparative Example 5.

A test electrode and an evaluation cell were prepared as in Example 1.

Comparative Example 6

A carbon material was prepared as in Comparative Example 1 above.

The carbon material and a powder of silicon oxide $SiO_{0.8}$ (particle diameter: 10 μm) were weighed out such that the proportion of silicon oxide was 5% by weight and sufficiently mixed with each other in an agate mortar. Hereby, a negative electrode active material was prepared.

A negative electrode was prepared as in Example 1 using the negative electrode active material prepared in Comparative Example 6.

A test electrode and an evaluation cell were prepared as in Example 1.

Comparative Example 7

A carbon material was prepared as in Comparative Example 1 above.

The carbon material and a powder of silicon oxide $SiO_{0.8}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Comparative Example 7.

A test electrode and an evaluation cell were prepared as in Example 1.

Comparative Example 8

A carbon material was prepared as in Comparative Example 1 above.

The carbon material and a powder of silicon oxide $SiO_{0.8}$ (particle diameter: 10 μm) were weighed out such that the proportion of silicon oxide was 50% by weight and sufficiently mixed with each other in an agate mortar. Hereby, a negative electrode active material was prepared.

A negative electrode was prepared as in Example 1 using the negative electrode active material prepared in Comparative Example 8.

A test electrode and an evaluation cell were prepared as in Example 1.

Comparative Example 9

A carbon material was prepared as in Comparative Example 1 above.

The carbon material and a powder of silicon oxide $SiO_{1.2}$ (particle diameter: 10 μm) were weighed out such that the proportion of silicon oxide was 30% by weight and sufficiently mixed with each other in an agate mortar. Hereby, a negative electrode active material was prepared.

A negative electrode was prepared as in Example 1 using the negative electrode active material prepared in Comparative Example 9.

A test electrode and an evaluation cell were prepared as in Example 1.

Comparative Example 10

A boron oxide powder was mixed with a petroleum coke powder having an average particle diameter of 12 μm by pulverizing in an agate mortar such that the amount of boron oxide powder was 10.0% of the amount of petroleum coke powder in terms of the atomic mass of boron. The resulting mixture was heated at room temperature to 1,000° C. at a rate of 10° C./min in a firing furnace containing an Ar atmosphere (Ar gas flow rate: 1 L/min) and maintained at 1,000° C. for 1 hour.

The fired carbon material was subjected to the same treatment as in Example 1 above to form a carbon material of Comparative Example 10.

The carbon material and a silicon powder (purity: 99.9%, particle diameter: 3 μm) were weighed out such that the proportion of silicon was 5% by weight and sufficiently mixed with each other in an agate mortar. Hereby, a negative electrode active material was prepared.

A negative electrode was prepared as in Example 1 using the negative electrode active material prepared in Comparative Example 10.

A test electrode and an evaluation cell were prepared as in Example 1.

Comparative Example 11

A carbon material was prepared as in Comparative Example 1 above.

A boron powder was mixed with a silicon powder (purity: 99.9%, particle diameter: 3 μm) by pulverizing in an agate mortar such that the amount of boron powder was 10.0% of the amount of silicon powder in terms of the atomic mass of boron. The resulting mixture was heated at room temperature to 1,400° C. at a rate of 10° C./min in a firing furnace containing an Ar atmosphere (Ar gas flow rate: 1 L/min) and maintained at 1,400° C. for 10 hours. Hereby, $SiB_{0.1}$ was prepared.

The carbon material and $SiB_{0.1}$ were weighed out such that the proportion of silicon was 5% by weight and sufficiently mixed with each other in an agate mortar. Hereby, a negative electrode active material was prepared.

A negative electrode was prepared as in Example 1 using the negative electrode active material prepared in Comparative Example 11.

A test electrode and an evaluation cell were prepared as in Example 1.

Analysis of Carbon Material

XRD Analysis

An analysis of an XRD analysis of each of the carbon materials included in the negative electrode active materials prepared in Examples 1 to 11 and Comparative Examples 1 to 11 confirmed that carbon layers included in each carbon material were arranged at intervals of 3.4 Å or less and had a crystallite thickness of 100 Å or more. In other words, it was confirmed that the carbon materials included in the negative electrode active materials prepared in Examples 1 to 11 and Comparative Examples 1 to 11 were all graphite.

XPS Analysis

The carbon materials included in the negative electrode active materials prepared in Examples 1 to 11 and Comparative Examples 1 to 11 were also analyzed by XPS and inductively coupled plasma-atomic emission spectroscopy.

In the XPS analysis, an XPS apparatus "PHI5600" produced by ULVAC-PHI, Inc. was used. The X-ray source used was Al. The B1s spectrum of each carbon material which occurred at a binding energy of 184.0 eV or more and 196.5 eV or less was measured.

On the basis of the B1s spectrum, the ratio of the area of a peak that occurred at a binding energy of 187.0 eV or more and 192.0 eV or less to the total area of peaks included in the B1s spectrum was calculated.

The ratio of the area of a peak that occurred at a binding energy of 187.0 eV or more and 188.5 eV or less to the total area of peaks included in the B1s spectrum was also calculated on the basis of the B1s spectrum.

The calculation of the peak area ratio in Example 1 is described below as an example.

Figure 2:
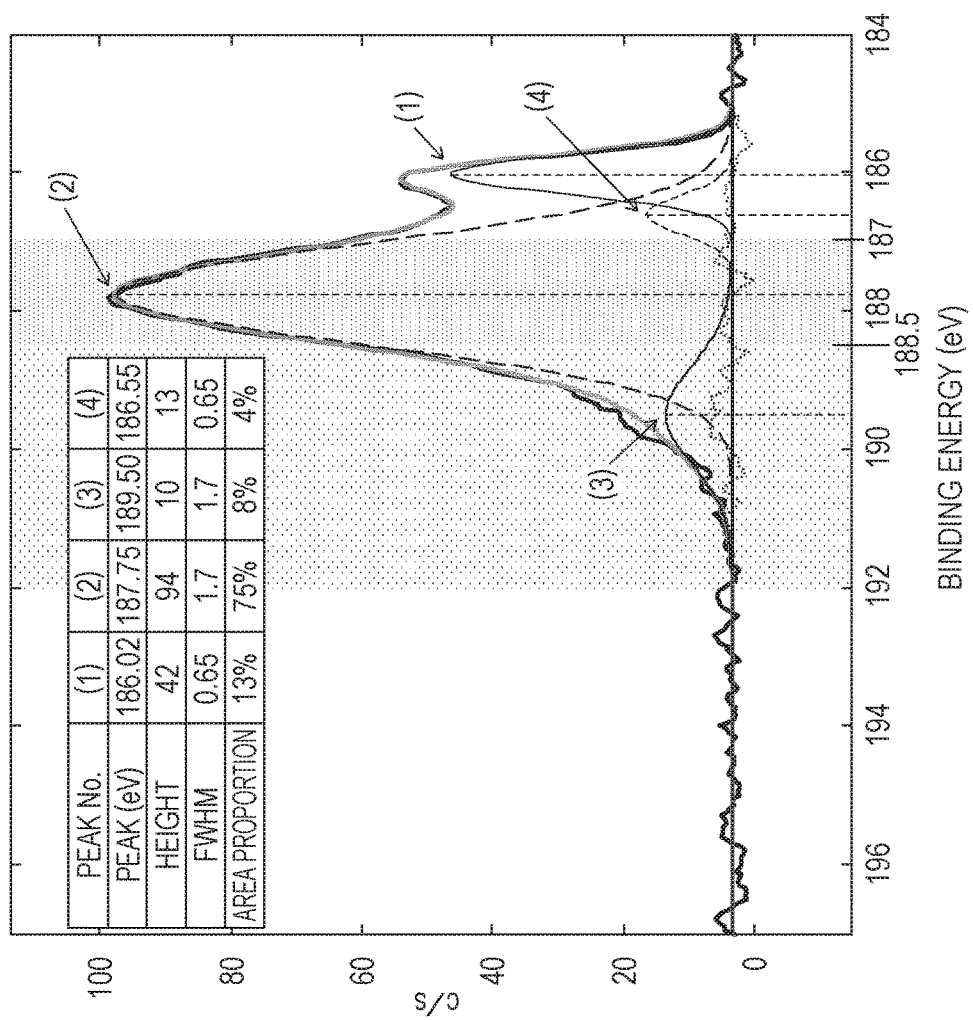
FIG. 2 is a diagram illustrating the results of an XPS analysis of a negative electrode active material prepared in Example 1.

FIG. 2 is a diagram illustrating the results of XPS analysis of the negative electrode active material prepared in Example 1.

In Example 1, four peaks (i.e., peak Nos. 1 to 4) occurred at a binding energy of 184.0 eV or more and 196.5 eV or less.

The total area of the peaks (i.e., peak Nos. 1 to 4) was calculated.

The area of the peaks that occurred at a binding energy of 187.0 eV or more and 192.0 eV or less (i.e., peak Nos. 2 and 3) was subsequently calculated. The proportion of the area of the peak Nos. 2 and 3 to the total area of the peak Nos. 1 to 4 was 83%.

The area of the peak that occurred at a binding energy of 187.0 eV or more and 188.5 eV or less (i.e., peak No. 2) was also calculated. The proportion of the area of the peak No. 2 to the total area of the peak Nos. 1 to 4 was 75%.

Analysis by Inductively Coupled Plasma (ICP) Spectroscopy

The content of boron in each of the carbon materials included in the negative electrode active materials prepared in Examples 1 to 11 and Comparative Examples 1 to 11 was measured with an ICP-AES apparatus "CIROS-120" produced by Spectro.

Analysis by Inert Gas Fusion-Thermal Conductivity Method

The content of nitrogen in each of the carbon materials included in the negative electrode active materials prepared in Examples 1 to 11 and Comparative Examples 1 to 11 was measured with nitrogen analyzers CS844 and TCH600 produced by LECO Corporation in accordance with an inert gas fusion-thermal conductivity method.

Charge-Discharge Test

The evaluation cells prepared in Examples 1 to 11 and Comparative Examples 1 to 11 were each subjected to a charge-discharge test and evaluated in terms of charge-discharge characteristics.

A method for evaluating charge-discharge characteristics and the results of the evaluation are described below.

The charge-discharge test of the evaluation cells was conducted in a thermostat maintained at 25° C.

In the charge-discharge test, each of the test electrodes including the respective negative electrodes was charged and, after an interval of 20 minutes, discharged.

The discharge capacity (i.e. charge-discharge characteristics) was evaluated by the following method.

Each of the evaluation cells was charged with a constant current of 0.5 mA per area of the test electrode until the difference in potential between the test electrode and the reference electrode reached 0 V.

Subsequently, Each of the evaluation cells was discharged with a constant current of 0.5 mA per area of the test electrode until the difference in potential between the test electrode and the reference electrode reached 1 V.

Then, there was an interval of 20 minutes.

The sequence of charging and discharging described above was considered to be one cycle, and 50 cycles of the charge-discharge test were conducted.

The discharge capacity in the second cycle and the discharge capacity in the 50th cycle were measured (hereinafter, referred to as "second-cycle discharge capacity" and "50th-cycle discharge capacity", respectively).

A value obtained by dividing the 50th-cycle discharge capacity by the second-cycle discharge capacity was considered to be a 50th-cycle capacity retention (%).

Table 1 shows the results of the charge-discharge test of each of the evaluation cells prepared in Examples 1 to 11 and Comparative Examples 1 to 11; the contents of boron and nitrogen in the carbon material included in the negative electrode active material; and the ratio of the area of a peak that occurred at a binding energy of 187.0 eV or more and 192.0 eV or less and the ratio of the area of a peak that occurred at a binding energy of 187.0 eV or more and 188.5 eV or less to the total area of the peaks that occurred at a binding energy of 184.0 eV or more and 196.5 eV or less in the B1s spectrum.

In the negative electrode active materials prepared in Comparative Examples 1 to 9, the boron content was below the detection limit (<0.05 wt %). Thus, "N.D." is shown in the columns.

In the negative electrode active materials prepared in Examples 1 to 3, 6, and 7 and Comparative Examples 1 to 11, the nitrogen content was below the detection limit (<0.05 wt %). Thus, "N.D." is shown in the columns. In the negative electrode active materials prepared in Comparative Examples 1 to 10, a clear peak was not confirmed at a binding energy of 187.0 eV or more and 192.0 eV or less or a binding energy of 187.0 eV or more and 188.5 eV or less in the XPS analysis. Thus, "N.D." is shown in the columns.

TABLE 1

| | Negative electrode active material | Physical properties of carbon material | | | | | Characteristics of battery | | |
|---|---|---|---|---|---|---|---|---|---|
| | | B content in carbon material (wt %) | N content in carbon material (wt %) | Proportion of area of peaks at 187.0 eV or more and 192.0 eV or less (%) | Proportion of area of peaks at 187.0 eV or more and 188.5 eV or less (%) | Content of Si or $SiO_x$ (wt %) | Second-cycle discharge capacity (mAh/g) | 50th-cycle discharge capacity (mAh/g) | 50th-cycle capacity retention (%) |
| Example 1 | Boron-containing graphite + Si | 3.8 | N.D. | 83 | 75 | 0.5 | 363 | 351 | 96.7 |
| Example 2 | | | | | | 5 | 450 | 409 | 90.9 |
| Example 3 | | | | | | 30 | 796 | 382 | 47.9 |
| Example 4 | Boron-containing graphite + $SiO_{0.1}$ | 0.6 | 0.4 | 61 | 8 | 0.5 | 359 | 349 | 97.2 |
| Example 5 | | | | | | 30 | 410 | 332 | 81.0 |
| Example 6 | Boron-containing graphite + $SiO_{0.8}$ | 3.8 | N.D. | 83 | 75 | 5 | 388 | 379 | 97.7 |
| Example 7 | | | | | | 30 | 705 | 683 | 96.7 |
| Example 8 | | 0.6 | 0.4 | 61 | 8 | 5 | 390 | 374 | 95.9 |
| Example 9 | | | | | | 30 | 735 | 690 | 93.9 |
| Example 10 | | | | | | 50 | 832 | 713 | 85.7 |
| Example 11 | Boron-containing graphite + $SiO_{1.2}$ | 0.6 | 0.4 | 61 | 8 | 30 | 534 | 511 | 95.7 |
| Comparative example 1 | Graphite + Si | N.D. | N.D. | N.D. | N.D. | 0.5 | 362 | 332 | 91.7 |
| Comparative example 2 | | | | | | 5 | 438 | 389 | 88.8 |
| Comparative example 3 | | | | | | 30 | 799 | 359 | 45.0 |
| Comparative example 4 | Graphite + $SiO_{0.1}$ | N.D. | N.D. | N.D. | N.D. | 0.5 | 355 | 309 | 87.0 |
| Comparative example 5 | | | | | | 30 | 403 | 275 | 68.2 |
| Comparative example 6 | Graphite + $SiO_{0.8}$ | N.D. | N.D. | N.D. | N.D. | 5 | 396 | 370 | 93.4 |
| Comparative example 7 | | | | | | 30 | 697 | 634 | 91.0 |
| Comparative example 8 | | | | | | 50 | 790 | 636 | 80.5 |
| Comparative example 9 | Graphite + $SiO_{1.2}$ | N.D. | N.D. | N.D. | N.D. | 30 | 545 | 511 | 93.8 |
| Comparative example 10 | Boron-containing graphite + Si | 3.6 | N.D. | N.D. | N.D. | 5 | 419 | 340 | 81.1 |
| Comparative example 11 | Boron-containing graphite + $SiB_{0.1}$ | 3.8 | N.D. | 83 | 75 | 5 | 376 | 340 | 90.4 |

Discussion

The results described in Table 1 confirm that the charge-discharge characteristics of the evaluation cells greatly varied depending on the state of boron included in the carbon material included in the negative electrode active material.

The carbon material included in the negative electrode active material prepared in Example 2 had a boron content of 3.8 wt %. The second-cycle discharge capacity of the evaluation cell prepared in Example 2 was 450 mAh/g, which was comparable to that of the evaluation cell prepared in Comparative Example 2, in which a carbon material that did not include boron was used. The 50th-cycle capacity retention of the evaluation cell prepared in Example 2 was 90.9%, which was higher than that (88.8%) of the evaluation cell prepared in Comparative Example 2, in which a carbon material that did not include boron was used.

The carbon material included in the negative electrode active material prepared in Comparative Example 10 had a boron content of 3.6 wt %, which was comparable to that of the carbon material used in Example 2.

However, the 50th-cycle capacity retention measured in Comparative Example 10 was low (81.1%).

In Comparative Example 10, any peak was not confirmed at a binding energy of 187.0 eV or more and 192.0 eV or less in the XPS spectrum.

Therefore, the proportion of boron dissolved in carbon layers was low, which presumably increased the proportion of boron that did not contribute to a reduction in the density of electrons in the carbon material. Thus, the low 50th-cycle capacity retention measured in Comparative Example 10 was low, although the boron content in the carbon material used in Comparative Example 10 was comparable to that of the carbon material used in Example 2.

The above results confirm that it is necessary that a peak of the XPS spectrum occur at a binding energy of 187.0 eV or more and 192.0 eV or less in order to produce a negative electrode active material capable of achieving improved cycle characteristics without reducing the high discharge capacity density of silicon or silicon oxide.

In the XPS spectra of the negative electrode active materials prepared in Example 1 to 11, a peak occurred at a binding energy of 187.0 eV or more and 192.0 eV or less.

Accordingly, the negative electrode active materials prepared in Example 1 to 11 achieved improved cycle characteristics without reducing the high discharge capacity density of silicon or silicon oxide compared with the negative electrode active materials prepared in Comparative Examples 1 to 10, in which any peak was not confirmed in the above range, even when the contents of boron and nitrogen and the proportion of silicon or silicon oxide were changed.

In Comparative Example 11, where the negative electrode active material included, in addition to the carbon material, silicon containing boron, the second-cycle discharge capacity was 376 mAh/g, which was lower than that (450 mAh/g) measured in Example 2, where the negative electrode active material included silicon that did not include boron.

The above results confirm that not adding boron to the silicon material as in Example 2 may limit a reduction in the charge-discharge capacity.

The discharge capacity measured in Example 9, where the nitrogen content was 0.4 wt %, was higher than that measured in Example 7, where the nitrogen content was below the detection limit.

The above results confirm that adding nitrogen to the carbon material as in Example 9 may enhance the discharge capacity.

The discharge capacity measured in Example 10, where the content of silicon oxide was 50% by weight, was larger than that measured in Example 8, where the content of silicon oxide was 5% by weight.

The above results confirm that adding a larger amount of silicon material to the negative electrode active material as in Example 10 may more enhance the discharge capacity.

The negative electrode active material according to the present disclosure may be suitably used as a negative electrode active material for batteries such as lithium secondary batteries.

What is claimed is:

1. A negative electrode active material comprising:
a carbon material including boron; and
a silicon material including at least one selected from silicon and silicon oxide, wherein:
the silicon material does not include boron,
a peak of a B1s spectrum of the carbon material occurs at a binding energy of 187.0 eV or more and 188.5 eV or less, a B1s spectrum being measured by X-ray photoelectron spectroscopy,
the silicon oxide is $SiO_x$, where $0.1 \leq x \leq 1.2$,
a ratio of an amount of the silicon oxide included in the silicon material to a total amount of the negative electrode active material is 0.5% by weight or more and 50% by weight or less, and
a ratio of the area of the peak of the B1s spectrum of the carbon material which occurs at a binding energy of 187.0 eV or more and 188.5 eV or less to the total area of peaks of the B1s spectrum which occur at a binding energy of 184.0 eV or more and 196.5 eV or less is 50% or more.

2. The negative electrode active material according to claim 1,
wherein a content of boron in the carbon material is 0.5% or more in terms of atomic mass of boron.

3. The negative electrode active material according to claim 1,
wherein a surface of the silicon material is coated with carbon.

4. The negative electrode active material according to claim 1,
wherein the carbon material includes nitrogen.

5. The negative electrode active material according to claim 4,
wherein a content of nitrogen in the carbon material is 0.4% or more in terms of atomic mass of nitrogen.

6. The negative electrode active material according to claim 1,
wherein the ratio of the amount of the silicon oxide included in the silicon material to the total amount of the negative electrode active material is 5% by weight or more and 50% by weight or less.

7. The negative electrode active material according to claim 6,
wherein the silicon oxide is $SiO_x$, where $0.8 \leq x \leq 1.2$.

8. The negative electrode active material according to claim 7,
wherein the ratio of the amount of the silicon oxide included in the silicon material to the total amount of the negative electrode active material is 5% by weight or more and 30% by weight or less.

9. A battery comprising:
a negative electrode including a negative electrode active material;
a positive electrode; and
an electrolyte, wherein:
the negative electrode active material includes:
a carbon material including boron; and
a silicon material including at least one selected from silicon and silicon oxide;
a peak of a B1s spectrum of the carbon material occurs at a binding energy of 187.0 eV or more and 188.5 eV or less, the B1s spectrum being measured by X-ray photoelectron spectroscopy,
the silicon material do not include boron,
the silicon oxide is $SiO_x$, where $0.1 \leq x \leq 1.2$,
a ratio of an amount of the silicon oxide included in the silicon material to a total amount of the negative electrode active material is 0.5% by weight or more and 50% by weight or less, and
a ratio of the area of the peak of the B1s spectrum of the carbon material which occurs at a binding energy of 187.0 eV or more and 188.5 eV or less to the total area of peaks of the B1s spectrum which occur at a binding energy of 184.0 eV or more and 196.5 eV or less is 50% or more.

10. The battery according to claim 9,
wherein the negative electrode active material is included in the negative electrode as a main component.

* * * * *